United States Patent [19]

Thompson et al.

[11] 4,183,435
[45] Jan. 15, 1980

[54] POLYMERIC MULTIPLE-LAYER SHEET MATERIAL

[75] Inventors: Kenneth P. Thompson, Canton, N.C.; Richard C. Ihde, Strongsville, Ohio

[73] Assignee: Champion International Corporation, Stamford, Conn.

[21] Appl. No.: 936,611

[22] Filed: Aug. 24, 1978

[51] Int. Cl.² .................. B65D 1/34; C08F 43/08
[52] U.S. Cl. .................................. 206/557; 126/390; 219/10.55 E; 220/405; 229/2.5 R; 428/322
[58] Field of Search ................ 206/557; 219/10.55 E, 219/10.55 M; 220/406, 405; 229/2.5, 3.5 R; 126/390; 428/315, 322

[56] References Cited

U.S. PATENT DOCUMENTS

| | | | |
|---|---|---|---|
| 3,684,633 | 8/1972 | Haase | 229/2.5 |
| 3,865,302 | 2/1975 | Kane | 229/3.5 R |
| 4,003,368 | 1/1977 | Maxel | 229/2.5 R |

Primary Examiner—William T. Dixson, Jr.
Attorney, Agent, or Firm—Evelyn M. Sommer

[57] ABSTRACT

A polymeric multiple-layer sheet material particularly suited for making containers for food products to be cooked or reheated in microwave ovens has a relatively thick core layer of foamed, high density polyethylene with thinner surface layers of a coextruded polyester, such as polyethylene terephthalate. The surface layers are preferably bonded to the core by suitable adhesive layers.

10 Claims, 3 Drawing Figures

POLYMERIC MULTIPLE-LAYER SHEET MATERIAL

BACKGROUND OF THE INVENTION

The present invention relates to multiple-layer sheet materials and more particularly to a polymeric multiple-layer material particularly suited for use in making containers for food products to be cooked or reheated in ovens.

All-plastic and plastic-paper laminates for use in making packages or containers are known. For example, U.S. Pat. No. 2,956,723 discloses a sheet material for making containers. The material is a laminated film having at least one lamina formed of a unidirectionally molecularly oriented, linear crystalline polyalkene, such as polyethylene, and at least one other lamina comprising low density polyethylene. Similarly, U.S. Pat. No. 3,927,245 discloses a resin-coated carton blank having a fiberboard core, both surfaces of which are covered by ethylene polymer coatings of specified thickness and density. A third ethylene polymer coating for instance polyethylene terephthalate is applied to the ethylene polymer coating which is to be on the exterior of a carton to be constructed from the blank.

Copending application Ser. No. 702,018, filed July 2, 1976, and assigned to the assignee of the present invention, discloses an all-plastic material which includes a core layer of high density polyethylene and at least one surface layer of lower density polyethylene. The softening point of the core layer is higher than the softening point of such surface layer. A container may be formed or erected from this material by conventional heat sealing techniques carried out at temperatures lower than the softening point of the core layer but at or higher than the softening point of each surface layer. As long as the temperature during the heat sealing operation remains below the softening point of the core layer, the core layer preserves the structural integrity and shape of the material.

The materials disclosed in prior art references, such as the foregoing, are for the most part intended to be used in making liquid containers such as milk cartons and the like where the nonporous nature of the material is the critical property. However, a new market or use for such materials is developing.

Microwave ovens are becoming more popular with consumers because of the speed at which such ovens can cook or reheat food and because of the lower energy requirements of such ovens relative to conventional radiant energy ovens. Because microwave ovens cook or reheat food from the inside out, the food containers are not subjected to the same temperatures as they are in conventional ovens. Containers used in microwave ovens are heated only by heat conducted from the food being cooked. Since the temperature demands on the containers are lower, consideration has been given to the use of all-plastic or partially-plastic containers for pre-packed frozen foods in place of the relatively more-expensive containers in which frozen food products are now typically packaged.

SUMMARY OF THE INVENTION

The present invention is a multiple-layer material particularly suitable for containers to be used in microwave ovens. The material includes a core layer of foamed, high density polymeric material and surface layers on both sides of the core layer. The relatively thin surface layers are a polyester material, such as polyethylene terephthalate. The core layer provides structural integrity for the material.

DESCRIPTION OF THE DRAWINGS

While the specification concludes with claims particularly pointing out and distinctly claiming that which is regarded as the present invention, further details of a preferred embodiment of the invention may be more readily ascertained from the following detailed description when read in conjunction with the accompanying drawings wherein:

DETAILED DESCRIPTION

Figure 1:
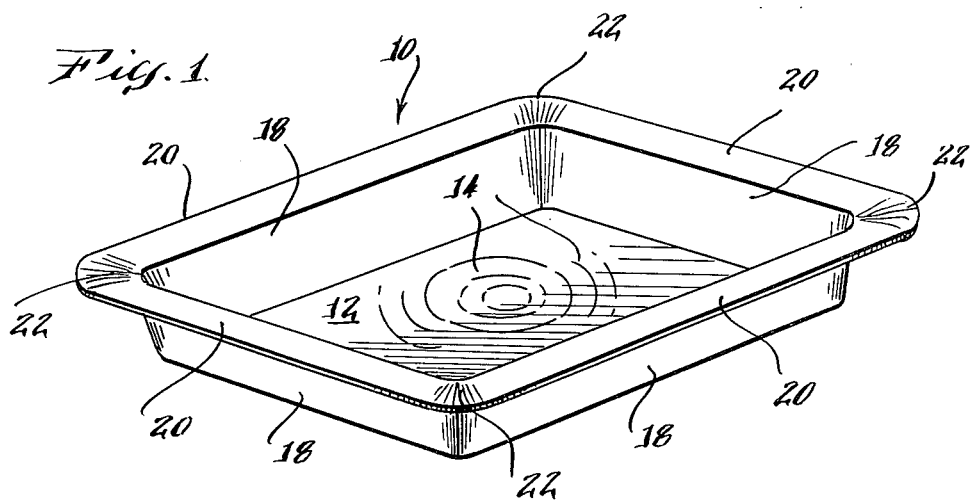
FIG. 1 is a perspective view of a tray made from material formed in accordance with the present invention.

Referring now to the drawings and particularly to FIG. 1, the illustrated tray 10 is typical of containers which may be made from materials formed in accordance with the present invention. The tray 10 may be press-formed from a generally rectangular piece of material and includes a floor 12 with rigidifying, partial or complete circular ridges 14. The tray further includes integral side walls 18 and a flange 20. Flange 20 provides a seat for a separate lid which would protect the tray contents during shipment, storage or marketing. The corners 22 of the tray are folded into fan-shaped segments as needed to form the rounded, outwardly-sloped corners in the press forming process.

Figure 2:
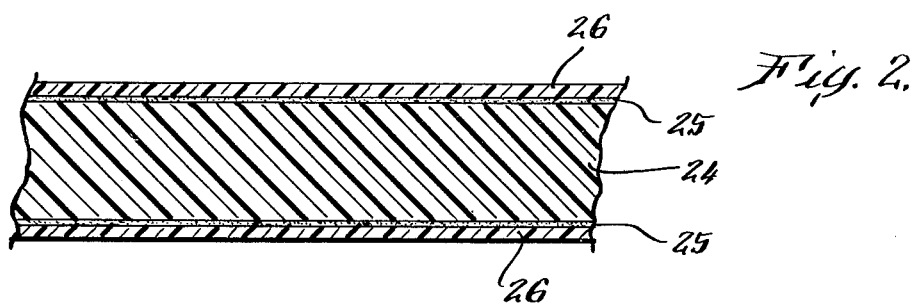
FIG. 2 is an enlarged cross sectional view of a multiple-layer composite material incorporating the present invention.
Figure 3:
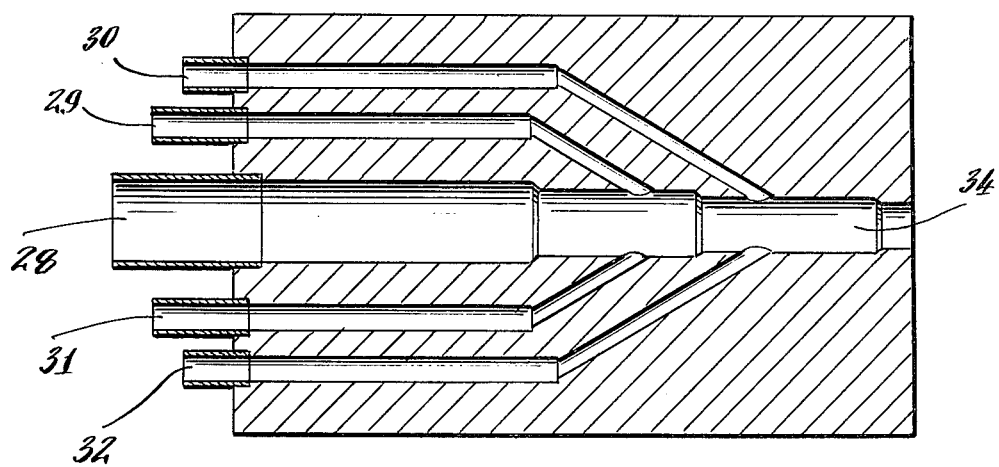
FIG. 3 is a cross sectional view of an extrusion die which might be used in making the material of FIG. 2.

FIG. 2 is an enlarged cross section of the multiple-layer sheet material which would be used for the tray blank. The material includes a relatively thick core layer 24 with thinner, coextensive surface layers 26. The core layer 24 and surface layers 26 may be bonded by interposed layers 25 of suitable adhesive. The core layer contemplated by the invention is a foamed, thermoplastic polymeric material which has a relatively high density in its unfoamed state. A preferred material would be a high density polyethylene or polypropylene with a relatively high softening point. The surface layers are preferably much thinner than the core layer and comprise a thermoplastic polymeric material such as polyethylene terephthalate, polypropylene or other suitable polyesters.

The multiple-layer composite material may be formed by a coextrusion process in which the surface and subsurface layer materials are superimposed upon the core layer material while all the materials are in a molten state. The molten materials are extruded through a single die head to bond the adjacent layers together. A die for carrying out this coextrusion process is shown in simplified form in FIG. 4. Molten, foamed high density polymeric material is injected into the die block through a channel 28. Where needed, adhesive materials are applied through channels 29 and 31. Molten polymeric material suitable for oven ware is injected into the die through channels 30 and 32 downstream of the adhesive channels. The channels 28–32 have a common outlet area 34. Molten material flowing from channels 31–32 provide an adhesive-coated base layer in the area 34 while core layer material injected through channel 28 provides a relatively thick central layer. Material injected through channels 29–30 provide an upper surface layer with an interposed layer of adhesive. The material formed in the area 34 is a multiple-layer material which is extruded through a slot 36 to effect bonding of adjacent layers of the material.

In one embodiment, the material may be a relatively heavy walled construction having a thickness in the range of 0.025 inches to 0.125 inches. This construction might be used to package 5–20 pounds of prepared food items for use in cafeterias. After being reheated, the container could be placed directly in a steam table, elminating the need for metal pans. Of course, the container could be thrown away when empty.

While there has been described what is considered to be a preferred embodiment of the invention, variations and modifications therein will occur to those skilled in the art when they become acquainted with the basic concepts of the invention.

For example, while a laminate having a foamed polyethylene core and polyethlene terephthalate surface layers has been described, other kinds of specific polymeric materials might be used, depending on the application of the material. For example, a foamed polypropylene core and polypropylene surface layers might be used for low temperature applications. Also, while the use of press-forming techniques for forming trays has been described, other techniques, including but not limited to thermoforming, might also be used.

Therefore, it is intended that the appended claims shall be construed to include not only the preferred embodiment but all such variations and modifications as fall within the true spirit and scope of the invention.

What is claimed is:

1. A multiple-layer sheet material from which containers adapted to heat food in microwave ovens may be erected, said sheet material comprising a core layer of foamed, high density polymeric material selected from the group consisting of high density polyethylene and polypropylene, and surface layers on both sides of said core layer, each of said surface layers being a relatively thin layer of polyethylene terephthalate.

2. A multiple-layer sheet material as recited in claim 1 further including adhesive layers for bonding said core layer to said surface layers.

3. A multiple-layer sheet material as recited in claim 2 wherein the material is formed by coextrusion of the core layer and surface layers.

4. A multiple-layer sheet material as recited in claim 1 wherein the material is formed by coextrusion of the core layer and surface layers.

5. A multiple-layer sheet material as recited in claim 1 wherein the material is formed by heat sealing of the surface layers to the core layer.

6. A tray suitable for use in a microwave oven comprising:
   a bottom wall panel; and
   a plurality of side wall panels connected to the edges of said bottom wall panel and extending generally upright therefrom,
   each of said panels being made of a multiple-layer sheet material comprising a core layer of foamed, high density polymeric material selected from the group consisting of high density polyethylene and polypropylene, having each surface covered by a relatively thin surface layer of polyethylene terephthalate.

7. A tray as recited in claim 6 further including adhesive layers for bonding said core layer to said surface layers.

8. A tray as recited in claim 7 wherein the sheet material is formed by coextrusion of the core layer and surface layers.

9. A tray as recited in claim 7 wherein the sheet material is formed by heat sealing of the surface layers to the core layer.

10. A tray as recited in claim 6 wherein the sheet material is formed by coextrusion of the core layer and surface layers.

* * * * *